Patented Oct. 24, 1939

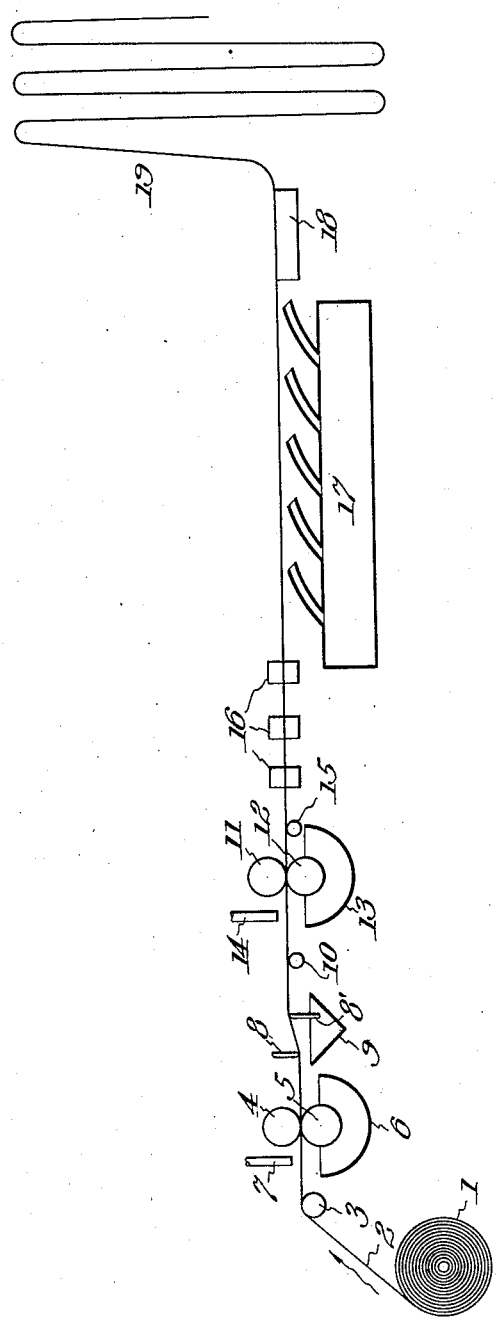

2,177,580

UNITED STATES PATENT OFFICE 2,177,580

PROCESS OF COATING PAPER

Laurence W. Porter, Westbrook, Maine, assignor to S. D. Warren Company, Boston, Mass., a corporation of Massachusetts Application January 4, 1937, Serial No. 119,018

4 Claims. (Cl. 91—68)

This invention relates to coated paper and to a method for producing the same.

In the manufacture of certain kinds of paper it is common practice to apply to a surface of the paper web a layer of coating in the form of a fluid suspension of finely divided solid particles in an aqueous medium containing suitable adhesive material. Casein and, to a lesser degree, animal glue are widely used as the adhesives, in such coating compositions, while starch is used to some extent. The starches in common use are those modified by some treatment, e. g., by oxidation, to reduce the viscosities of their solutions. Starch, however, cannot be satisfactorily waterproofed; hence starch makes an unsatisfactory adhesive for water-resistant coatings. On the other hand, since starch usually can be obtained for half or less of the cost of casein, the incentive is obvious for the substitution of starch for at least part of the casein.

Mixtures of starch and casein can be made satisfactorily water-resistant. Unfortunately, however, in coating compositions containing a mixture of starch and casein the strengths of the two adhesives are not fully developed. For instance, two coating mixtures, one containing starch and the other casein, may both be of adequate strength to resist picking on the printing press when used alone, but if they are mixed together the resulting coating is weak and considerable additional adhesive is required to bring the strength of the coating back to normal. The additional adhesive required obviously increases the cost of the coating, and, at the same time, by increasing the non-pigment constituent of the coating, tends to lower the printing quality of the finished paper. Resort has been made to various expedients in attempting to develop full adhesive strength in such starch-casein mixtures, such as special methods of processing the starch or special treatments of the mixed adhesive (e. g., homogenization), without resulting, as far as I am aware, in a commercially successful method.

It has been proposed, also, to coat paper with a fluid coating mixture containing a starch adhesive, dry the so-coated paper, re-coat it with a fluid coating mixture containing casein, and dry the resulting coated product. In such case a composite coating is obtained, having a water-resistant surface and at the same time utilizing the full adhesive strengths of both the starch and the casein. The extra labor and increased quantity of waste paper resulting from the intermediate drying may, however, more than offset the saving in cost of adhesive used, and so, except for special cases, may make the process economically unfeasible.

An object of the invention is the provision of a paper product having a composite coating of which the underlying layer comprises a carbohydrate adhesive and the superficial layer of which comprises a protein adhesive. Similarly, an object is the provision of an improved process of producing a coated paper product having a coating comprising starch and casein, in which coating the full strength of each adhesive is effective.

Another object of the invention is to provide a method for the multiple coating of paper with dissimilar coatings without intermediate drying. Likewise, an object of the invention is to provide a method whereby a composite coating consisting of superimposed layers may be smoothed by a single operation.

Other objects and advantages of the invention will become apparent from the following description.

In the practicing of the present invention, a surface of a paper web is coated with a substantial amount of an appropriate fluid coating composition comprising pigment and adhesive; more particularly, a fluid coating containing a non-water-resistant adhesive such as starch or other carbohydrate; the viscosity and solids content of the coating mixture and/or the quantity of coating applied are so controlled that this first-applied coating layer is still wet and plastic but no longer in a flowable condition when a second coat is applied thereto, a second fluid coating composition such as a coating mixture containing an adhesive capable of resisting water or of being rendered water-resistant, e. g., casein or glue, is applied on top of the still wet but non-fluid coating left by the former coating step; and the resulting composite coating is then smoothed in any conventional manner, as, for example, by brushes, and dried. It should be noted that while the first coat may advantageously be leveled to some extent, as by scrapers or rolls, it is unnecessary to smooth this coat to a finished condition, one final smoothing of the composite coating being sufficient.

The accompanying drawing is a diagrammatic side-elevation of the apparatus used in carrying out the process described.

As a typical instance of the manner in which the invention may be practiced, the following example is given:

From a reel 1 of paper of the type generally used as body stock for coated paper web 2 is led over guide rolls 3 and through the nip between squeeze rolls 4 and 5. Lower roll 5, turning in a pan 6 containing coating mixture, applies coating to the lower side of web 2 while fountain 7 applies coating mixture to the top of said web.

A suitable coating mixture for application as the underlying or primary coating is the following:

| | | |
|---|---|---|
| Clay | parts | 100 |
| Oxidized starch | do | 25 |
| Water to make solids | per cent | 49 |

The squeeze rolls 4 and 5 may be so set that a slight excess of coating is left on the paper web 2 as it leaves the nip 4—5. The paper web passes over blades 8 and 8', one on either side of the web, which blades remove the excess of coating and smooth the remainder to a considerable extent. The material scraped off by blades 8 and 8' falls into pan 9 where it may be diluted and then returned for use again. The excess quantity of coating passed through nip 4—5 is so regulated that the coating scraped off by blades 8 and 8' is in a pasty condition. If too little excess is passed through the nip, the surface will be scratched rather than smoothed by the blades; if, on the other hand, too much excess is passed through the nip, the coating will be too freely fluid when it reaches the scrapers and/or the point where a second coat is applied. In other words, it is necessary to balance the excess of coating applied against the absorbency of the paper stock of web 2. When the correct balance is obtained, the dry paper base of web 2 absorbs into its interior sufficient water from the coating so that the latter is "set" in a non-flowing condition. In this case when a top coating is subsequently applied the two coatings do not freely mingle, but rather bond together at a more or less plane interface. When the latter condition is fulfilled a strong and satisfactory coating results.

The blades 8 and 8' may well be rods of about ⅛ inch diameter backed by a stiffening support. The blades may be raised or lowered relative to the plane of the paper web 2, in order to alter the angle at which the paper passes over them, so that equal scraping action can be obtained on both sides. A total dry weight of about 12 pounds of coating per ream (25 x 38—500) is a workable quantity to leave on web 2 at this point.

Web 2 after leaving blades 8 and 8' passes guide roll 10 and next enters the nip between rolls 11 and 12. From this point the equipment shown is a typical brush-coater generally used for coating paper. The lower roll 12 turns in a pan 13 of coating mixture and carries the coating to the lower side of the web, while fountain 14 supplies coating to the top side thereof. The quantity of second coating mixture applied is regulated by the adjustment of the space between rolls 11 and 12. A satisfactory weight to apply in the second coating step is 12 pounds dry weight per ream, making the total coating about 24 pounds per ream.

The following composition provides a satisfactory second, or finishing, coat:

| | | |
|---|---|---|
| Clay | pounds | 80 |
| Blanc fixe | do | 14 |
| Satin white | do | 16 |
| Casein | do | 19 |
| Water to make solids | per cent | 37 |

I may employ in this second applied coating composition pigments which have been more highly refined than the pigments employed in the first applied composition, and/or different pigments.

Web 2 leaving rolls 11 and 12 passes over supporting rolls 15 and then between several successive sets of reciprocating brushes 16, which latter smooth the composite coating to leave a level surface on each side of the coated web. The latter may then pass over an air floater 17 until the coating is set sufficiently to be touched, whereupon the paper may pass to a suction apron 18 before a festoon drier 19 and then be finished further in any desired way.

In the preceding formulas for the two coatings the quantity of adhesive given in each case is the normal quantity required by the same body stock when the 24-pound coating is entirely of the priming coat formula or entirely of the finishing coat formula, respectively. By "normal quantity" is meant the quantity required to prevent picking of the coating when printed on a letter press with a standard ink. Thus it is seen that full additive adhesive strength is obtained from the given combination of starch and casein in the composite coating.

When a well sized body stock is employed the primary coat may, with good results, contain a lower proportion of starch or other carbohydrate adhesive. For instance, the starch content of the hereinbefore recited primary coat composition may be reduced to 15 parts, especially if a fairly viscous starch be used, and when this coat is covered with the finishing coat in the manner described the resulting composite coating is still very satisfactory. In this particular case it is seen that less total adhesive is used than would have been required if a single coating of equal weight of either the primary or the finishing coating formula had been used. In other cases, particularly if the body stock be weak or poorly sized, considerably more starch, say up to 35 or even 45 parts, may be used in the priming coat. The same finishing coat applied thereto will still give a satisfactory printing surface.

The strength of the primary coating may conveniently be determined by withdrawing a strip of the prime coated paper before the application of the finishing coat, drying the paper, and testing it by the commonly used Dennison paper-testing waxes. The Dennison waxes consist of consecutively numbered sticks graded as to strength, with the lower numbers having the lower strengths. To make the test a stick of wax is softened by heat, applied to the coated surface, cooled, pulled from the coated surface, and examined. The number of the highest wax which does not lift particles of coating from the paper may be called the "wax-strength" of the coating being tested. Experience has shown that, given a particular type of coated paper to be printed on a standard type of press with a standard ink, there is a critical wax-strength below which the coating must not drop if it is to print without picking on the press.

Speaking generally, in the practice of the present invention it is preferred that the wax-strength of the primary coat shall be as high as the critical wax-strength of the finished product. For instance, assuming that the final coated paper must have a wax-strength of 4, then preferably the primary coat should likewise have a strength of at least 4. This should not be understood necessarily to mean, however, that the primary coating itself must print without picking under the same standard conditions, for starch coatings may actually have a higher critical wax-strength than do casein coatings. That is, a starch coating to print without picking may require a wax test of 1 or even 2 waxes higher than a corresponding casein coating. However, in most cases where the primary coat does have a wax-strength just equal to that desired in the finished product, it is found that in the finishing coat the ratio of casein to pigment can be reduced below that which the same pigment would require if applied directly to the paper base without the intervening primary coat. Thus it is seen that it is possible that in both coats at the same time the quantity of adhesive may be reduced below the quantity that would be required for safe printing if either coat were used alone on the paper base.

If the starch in the primary coat is increased so that the strength of that coat rises above the wax-strength desired in the finished paper, it is found that the casein content of the finishing coat can be still further reduced and yet yield a printing surface of ample strength. The reduction in casein (from that required when a single coat is applied directly to the paper base) may be as much as about 15 per cent, obviously making a very appreciable saving in adhesive costs. Conversely, but less desirably, the starch in the primary coat may be reduced somewhat below that required to give a wax-strength equal to that desired in the finished paper. In this case the casein in the finishing coat can be increased so that the final product may still be satisfactorily strong. In either case, however,—that is, in reducing the starch to give a primary coat with a wax strength below that required in the final product, or in reducing the casein in the finishing coat below the "normal" quantity required on untreated body stock,—there is soon reached a limit (at approximately 20% reduction) which if exceeded will result in a weak final product, no matter how much the compensating adhesive in the other coat is increased.

It is found that the effect of fluctuations in the quality of the body stock is in large measure absorbed by the priming coat and is not reflected to more than a minor degree in the finishing coat. As a result commercial operation may be maintained with the finishing coat nearer the critical wax strength than would be feasible if said coat were applied directly to the paper base. Consequently the printing quality and finish of the surface are both improved; more important still, uniformity of finish and printing quality can be maintained to a degree not obtainable when a single coat is applied. Furthermore, in cases where a finished product having unusual coating strength is required, the strength may be obtained by strengthening the primary coating without in the finishing coat objectionably increasing the casein to the detriment of printing quality.

Although the blades 8 and 8' form a convenient means of limiting and smoothing the initial or priming coat, their use is not essential to the process. Instead, the weight of coating applied may be limited entirely by squeeze rolls 4 and 5. If desired the coating may be satisfactorily smoothed by idle or driven smoothing rolls (say, of 1 inch diameter) substituted for blades 8 and 8'. In some cases it may be satisfactory to omit means for smoothing the priming coat between the two sets of squeeze rolls, and depend entirely upon the smoothing means used to level the composite coating after the web has received the two dissimilar coatings and has passed the final squeeze rolls.

It is obvious that the exact compositions of the two coatings are immaterial to the successful practice of the invention. Any of the usual pigments may be used in either coating, and the starch and casein may be replaced by any other carbohydrate or, respectively, by any other protein adhesive.

The process is likewise advantageous where a single adhesive is used in cases where the body stock has been insufficiently or unevenly sized in the beater. Such under-sized or unevenly sized body stock ordinarily requires a higher than normal concentration of adhesive in the coating in order to ensure a firm bond between coating and fiber. A similar case is that where the body stock is "soft", that is, so insufficiently hydrated or so poorly felted that the paper itself is weak to splitting stresses. In such a case, also, it is customarily necessary to increase the adhesive content of the coating to guard against the paper-base splitting when being printed. In both of these cases, however, the increase in adhesive required, besides materially increasing the cost, has an unfavorable effect upon both the printing quality and the folding quality of the finished paper. By the method here disclosed, a priming coat having a high adhesive content may be first applied to ensure a good bond to the paper, and a normally sized top coat may then be applied to ensure the desired printing surface. Thus it can be seen that in such a case an actual saving in adhesive may be obtained by the two-coat method, and this is true whether adhesive of the same or of different nature is used in the two coats.

The total weight of coating applied may be any weight commonly applied to coated paper or fabric. Likewise the weight ratio of priming coat to top coat may vary over a wide range. When the chief purpose is economy, naturally it will be advantageous to use a relatively heavy priming coat followed by a lighter top coat. On the other hand, if the purpose is merely to ensure a good bond to doubtful body stock, a priming coat of relatively light weight followed by a relatively heavy top coat will give good results. In general, however, a ratio of 6 parts of priming coat to 4 parts of top coat is satisfactory for all purposes.

In certain coating processes it has been customary, in the past, to pre-wet the paper web with water or coating mixture before applying the final coating. The purpose of such wetting is to prevent skips in coating due to air-pockets, or to ensure filling the surface pores of the paper. The quantity of pre-wetting coating left on the paper is generally a thin film, and no attempt is made to prevent mingling of this coat with the superimposed final coating. Prior to my invention there has been no recognition of the desirability of applying a priming coat of substantial weight set to a non-fluid but still wet condition before the application of the finishing coat. By this invention, however, the priming coat is made to "set" to a non-flowing but still plastic condition, before the application of the finishing coat. In the final smoothing operation the interface between the two coats, while probably changed somewhat in contour by the smoothing action, is definitely not ruptured, and the liquids of the two coatings do not mingle to any substantial extent.

The process makes possible economies in successfully combining starch and casein coatings without intermediate drying; it provides a means for producing satisfactory and reliable coated paper when using body stock of doubtful quality; and by a single operation it yields definite improvement in the printing qualities ordinarily obtainable by coating paper twice; i. e., with drying between coats.

While the invention has been described in connection with coating both sides of the paper simultaneously, it can equally well be used in the simpler operation of coating one side only, or in coatings the two sides successively, and such applications are meant to be included in the scope of the disclosure. It should be obvious likewise that while the coating material is described as being applied by squeeze rolls in each step, and as being given its final smoothing by brushes, other conventional means of applying the coating compositions and of smoothing the coatings may be substituted if desired. For instance, the coating may be applied in either or both cases by means of a rotating brush or by spraying, or by other means, and the final smoothing may be accomplished with use of an air-brush or by means of a smoothing roll, and still remain within the scope of the invention.

I claim:

1. Method of coating paper, which comprises applying to a surface of a moving web of paper an excess of an aqueous coating composition comprising carbohydrate adhesive and pigment, and removing excess coating composition, the viscosity and solids content of the coating composition being balanced against the absorptivity of the paper and the weight of coating so that the coating assumes a plastic and wet but non-flowing condition; then superimposing upon said wet and plastic but non-flowing coating a second coating layer of aqueous coating composition comprising protein adhesive and pigment, the second coating layer not freely mingling with the first coating but the two layers bonding together at a more or less plane interface; smoothing the resulting composite coating; and drying the resulting coated product.

2. Method of coating paper, which comprises applying to a surface of a moving web of paper an excess of an aqueous coating composition comprising carbohydrate adhesive and pigment, and removing excess coating composition, the viscosity and solids content of the coating composition being balanced against the absorptivity of the paper and the weight of coating so that the coating assumes a plastic and wet but non-flowing condition; then applying over said wet and plastic but non-flowing coating an excess of aqueous coating composition comprising protein adhesive and pigment and removing the excess of the resulting second coating, the second coating layer not freely mingling with the first coating but the two layers bonding together at a more or less plane interface; smoothing the resulting composite coating; and drying the resulting coated product.

3. The method defined in claim 1, in which the composite coating consists of a major amount by weight of the solids content of the first-applied coating composition and a minor amount by weight of the solids content of the second-applied coating composition.

4. The method defined in claim 1, in which the first coating composition contains starch as adhesive and in which the second coating composition contains casein as adhesive.

LAURENCE W. PORTER.